United States Patent
Rao

[11] 3,913,926
[45] Oct. 21, 1975

[54] SEAL CONSTRUCTION FOR A ROTARY CERAMIC REGENERATOR FOR USE IN A GAS TURBINE ENGINE

[75] Inventor: V. Durga Nageswar Rao, Woodhaven, Mich.

[73] Assignee: Ford Motor Company, Dearborn, Mich.

[22] Filed: Apr. 15, 1974

[21] Appl. No.: 461,195

[52] U.S. Cl. .................. 277/96; 165/9; 277/235 A
[51] Int. Cl.² ......................................... F28D 19/00
[58] Field of Search ............ 165/9; 277/96 R, 96 A, 277/235 A; 117/193.1 DF

[56] References Cited
UNITED STATES PATENTS
3,743,008   7/1973   Zeek et al. ............................ 165/9

*Primary Examiner*—Robert I. Smith
*Attorney, Agent, or Firm*—Donald J. Harrington; Keith L. Zerschling

[57] ABSTRACT

A seal construction for sealing separate gas flow zones of a ceramic rotary regenerator core mounted for rotation in a gas turbine housing including a flexible graphite sheet bonded either to the ceramic core or to the adjacent sealing surface of a metal substrate portion of a regenerator seal construction, said seal construction registering with the peripheral region of the rotary regenerator matrix and defining a high-pressure, low-temperature gas flow zone and a low-pressure, high-temperature gas flow zone, the graphite sheet being flexible to accommodate sealing surface irregularities thereby maintaining sealing surface of relatively low coefficient of friction.

3 Claims, 4 Drawing Figures

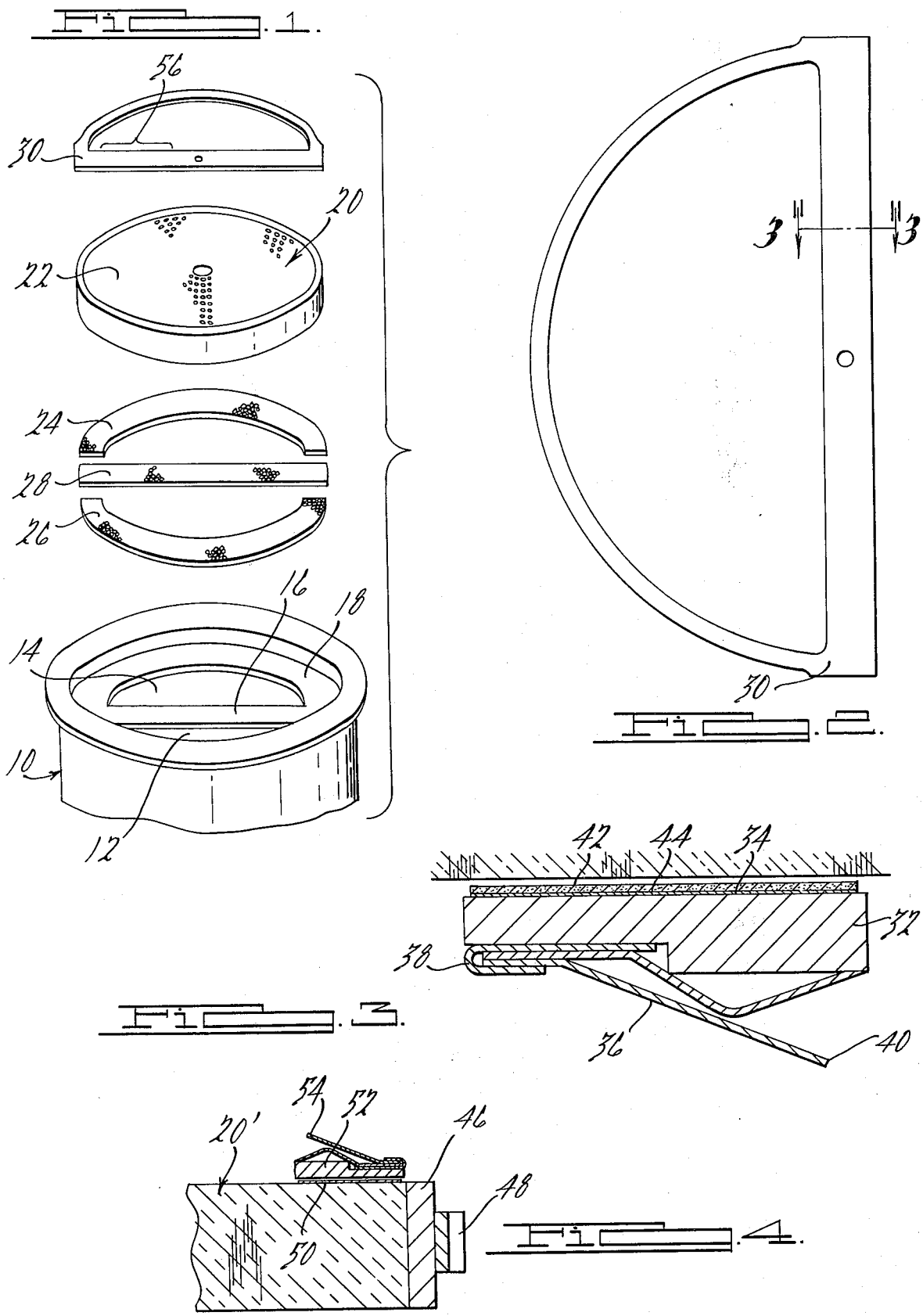

SEAL CONSTRUCTION FOR A ROTARY CERAMIC REGENERATOR FOR USE IN A GAS TURBINE ENGINE

GENERAL DESCRIPTION OF THE INVENTION

The improvements of my invention are adapted to be used in a gas turbine regenerator seal for a rotary ceramic regenerator core. The seal cooperates with the regenerator core surface and with the surrounding gas turbine housing to define separate passages through the regenerator core for the high-temperature, low-pressure gases and for the low-temperature, high-pressure gases. The thermal energy of the high-temperature gases is stored in the regenerator matrix at one location and is transferred to the high-pressure, low-temperature zone as the regenerator matrix is rotated thereby causing an increase in the inlet air temperature for the gas turbine engine combustor.

I am aware of certain rigid graphite block seals for use in ceramic regenerators of this type wherein the seals are caused to sealingly engage the surface of the rotating regenerator matrix. Such graphite seals are relatively rigid and regions of high coefficient of friction on the matrix surface cause shear forces that develop heat. This in turn results in a transfer of graphite material to the rubbing surface of the matrix. The lubricants that normally exist in the inner crystalline crevices of the graphite, such as water and various salts, become evaporated and are driven out of their inner crystalline locations by the heat that is developed due to friction. This causes the pure graphite then to act directly on the rubbing seal surface without any lubricant layer. The resulting friction aggravates the high wear problem, which creates added heat. This in turn drives out more inner crystalline material from the seal surface.

I have overcome the shortcomings that have been experienced in such seal designs. My improved seal includes a flexible graphite sheet with a thickness of approximately 0.010 to 0.030 inches. In one embodiment of my invention, the sheet is bonded to an adjacent surface of a seal support shoe. The surface of the flexible graphite sheet sealingly engages the surface of the rotating regenerator matrix, and it will flex when a high friction zone on the sealing surface is encountered thereby bringing the adjacent lower friction surfaces into contact with the relatively moving surface. The friction forces then will be distributed over a relatively large low friction area rather than over a localized high friction area, thus avoiding the breakdown that is characteristic of rigid graphite block seals of conventional construction. In another embodiment of my invention the graphite is bonded or cemented directly to the regenerator matrix surface. The rubbing surface of the sheet then engages the metallic shoe which may be spring loaded by diaphragm seal elements into frictional contact with the graphite.

BRIEF DESCRIPTION OF THE FIGURES OF THE DRAWINGS

FIG. 1 shows a schematic, exploded view of a regenerator housing portion of a gas turbine engine, a rotary regenerator matrix and a pair of regenerator seals situated on either side of the matrix.

FIG. 2 is an enlarged view of the D-shaped seal portion shown in FIG. 1.

FIG. 3 is a cross sectional view taken along the plane of section line 3—3 of FIG. 2. This embodiment shows a flexible graphite sheet bonded to a metal substrate of a seal assembly.

FIG. 4 shows in cross sectional form a portion of the rotary regenerator matrix shown in FIG. 1 including a seal assembly wherein the flexible graphite sheet is cemented directly to the regenerator surface rather than to the metal substrate as in the FIG. 3 embodiment.

PARTICULAR DESCRIPTION OF THE INVENTION

In FIG. 1 numeral 10 designates a regenerator housing of a gas turbine engine. Low pressure exhaust gases from the engine pass through the exhaust gas flow passage 12 and high pressure, low temperature intake air passes into the housing through passageway 14. The housing 10 is provided with a separating wall having a flat seal backup surface 16. Surrounding the inner periphery of the regenerator housing is a ledge having a peripheral flat seal backup surface 18. The ceramic regenerator matrix 20 is situated in the regenerator housing 10. It is generally cylindrical and it is provided with an outer surface 22 that is machined flat with a surface normal parallel to the geometric axis of the matrix.

Two C-seals 24 and 26 are situated between the lower surface of the regenerator matrix 20 and the seal backup surface 18. A crossarm seal 28 is situated between the matrix 20 and surface 16. A D-seal 30 engages the upper surface 22 of the matrix 20. A regenerator cover, not shown, is placed over the housing 10 thereby providing a backup for the D-seal 30. The compressed air passes through the regenerator matrix and is heated. It then passes through the passageway 14 and enters the gas turbine combustor.

The combustion products for the combustor pass through the various turbine stages and then the hot exhaust gases, which are of relatively low pressure, pass through the opening 12 and through the regenerator matrix 20 where the exhaust heat is recovered. Upon rotation of the matrix 20 the thermal energy recovered from the exhaust gases is transferred to the inlet air.

The high pressure gases are sealed from the low pressure gases by the seal assembly shown at 24, 26 and 28 on the lower surface of the regenerator matrix and the D-seal 30 on the upper surface which is the outermost surface. The D-seal is shown more particularly in FIG. 2. It comprises a metal shoe substrate 32, which is formed with a flat seal surface 34. The outermost surface of substrate 32 is adapted to register with a diaphragm seal assembly 36 in which the inner margin 38 is secured by welding or by other suitable fastening means to the substrate 32. The opposite margin 40 of the seal assembly engages the adjacent surface of the cover for the regenerator housing so that it is flexed thus urging the seal assembly into frictional engagement with the surface 22 of the regenerator matrix 20. The substrate 32 has a D-shape which is similar to the seal shape illustrated in FIG. 2. The upper surface 34 of the substrate has bonded thereto a thin flexible graphite sheet 42, the bond material being indicated by reference character 44. The surface of the sheet 42 slidably engages the surface 22 of the regenerator matrix.

In FIG. 4 I have shown a portion of a regenerator matrix 20'. It is surrounded by a steel rim 46 which carries a ring gear 48. A drive pinion, not shown, meshes with ring gear 48 thereby driving the regenerator about its geometric axis. The periphery of the matrix 20' has bonded thereto a flexible graphite sheet 50. The surface of the sheet 50 engages a steel substrate 52 which establishes sealing contact with the surface of the graphite. As in the FIG. 3 embodiment, the substrate 52 is urged into sealing engagement with the graphite by a diaphragm type seal spring 54.

The flexible graphite in my improved seal construction should have a thickness of between 0.010 and 0.030 inches. Suitable graphite materials are supplied by Union Carbide Corporation under the trade name "Graphoil." Another suitable graphite material is supplied by Stackpole Carbon Company under the trade name "Stackfoil."

If there is any thermal expansion differential between the shoe and the graphite material, the graphite will be allowed to flex with the shoe.

Several commercially available adhesives may be used to bond the graphite to the steel shoe. I have used successfully a thermoplastic polymer known as Astrel manufactured by the MMM Company. This is capable of establishing a durable bond up to temperatures of 600°F and higher. Also certain silicone rubber adhesives may be used at relatively low temperatures. Aluminum oxide base ceramic adhesives such as Ceramabond 503 will provide service up to about 1200°F. At the low pressure carryover region of the D-seal, which is identified in FIG. 1 by reference character 56, a mechanical bond might be used between the shoe and the graphite such as brass screws or rivets. This may be desirable because of the relatively high temperatures at this location in comparison to the temperatures that exist at other parts of the D-seal. The aluminum oxide base ceramic bonding material normally is preferable for the inner seal assembly shown at 24, 20, 6 and 28 due to the fact that the temperatures on the inner surface of the matrix are higher.

If a particular insulation should require it, the graphite seal shapes may be stacked together to provide added thickness. In that case the various sheets can be bonded together in the same manner similar to the bonding of the first sheet to the substrate. For example, in some installations a thickness of 0.120 inches might be used.

In applying the bonding material for the outer seal to the metal substrate, the surface of the substrate is thoroughly degreased. A body material such as Polymar 360 is applied in the form of a thick paste to the surface of the substrate and then it is dried at a temperature of about 300° to 320°F. A thin coat of Polymar 360 then is applied to the graphite surface. The graphite sheet then is pressed onto the substrate and squeezed in place with an initial pressure of 10 pounds or so. The press for applying the squeezing pressure should be preheated to a temperature of about 600°F.

The graphite is placed on the heated platen and pressure is not applied until the temperature of the graphite reaches the platen temperature. The platen then is applied to the substrate and a pressure of about 200 psi is developed. This pressure is held for 15 minutes and then the platen is cooled down to a temperature of about 450° before the platen is removed.

In applying the ceramic bonding material to the graphite of the inner seal, the substrate first is washed with a detergent and bond material such as Ceramabond is applied in a thick layer to the substrate. A thin layer of the same adhesive then is applied to the graphite surface to be bonded. After a short wait to assure that trapped air bubbles escape, the graphite is placed on the substrate, matching the adhesive side on the substrate with the adhesive side on the graphite. The excess adhesive is removed by applying a squeezing pressure to the graphite. Heat is applied to the laminate under pressure. The temperature of the platen is brought slowly up to a value of about 300°F. The laminate then is cooled rapidly under pressure. This is accomplished by transferring the laminate from the press at 600°F to another press at room temperature and then applying a pressure of about 50 to 100 psi.

Having thus described preferred forms of my invention, what I claim and desire to secure by U.S. Letters Patent is:

1. A gas turbine regenerator seal for use with a ceramic rotary regenerator matrix, said seal comprising a metal substrate having a seal surface disposed adjacent the surface of the matrix, diaphragm seal spring means for applying a sealing pressure to said metal substrate, a thin, flexible graphite sheet material situated between the surface of said substrate and the adjacent surface of said matrix, said graphite sheet being of a thickness of approximately 0.010 to 0.030 inches, and adhesive means located between said sheet material and one of said adjacent surfaces for bonding said graphite sheet to said one of said adjacent surfaces.

2. The combination as set forth in claim 1 wherein said graphite sheet is bonded to said metal substrate, the exposed surface of said graphite sheet being sealingly engageable with the surface of said matrix, the thermal expansion differential between the matrix and the graphite sheet being accommodated by the flexing of said substrate, said graphite sheet being flexible upon the development of a localized high friction area on the matrix surface thereby avoiding a breakdown of the surface of the graphite.

3. The combination as set forth in claim 1 wherein said graphite is bonded to the surface of said regenerator matrix, the unbonded surface of said graphite being slidingly engageable in sealing relationship with the adjacent surface of said substrate as the latter is urged into sealing engagement with the graphite by said diaphragm seal means.

* * * * *